(12) United States Patent
Huang

(10) Patent No.: US 11,632,492 B2
(45) Date of Patent: Apr. 18, 2023

(54) OPTICAL LENS ASSEMBLY AND PHOTOGRAPHING MODULE

(71) Applicant: NEWMAX TECHNOLOGY CO., LTD., Taichung (TW)

(72) Inventor: Ya-Hsin Huang, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 17/540,444

(22) Filed: Dec. 2, 2021

(65) Prior Publication Data

US 2023/0090332 A1 Mar. 23, 2023

(30) Foreign Application Priority Data

Sep. 23, 2021 (TW) .................. 110135430

(51) Int. Cl.
| | |
|---|---|
| H04N 5/225 | (2006.01) |
| G02B 3/04 | (2006.01) |
| G02B 9/12 | (2006.01) |
| G03B 17/14 | (2021.01) |
| G02B 13/00 | (2006.01) |
| G02B 5/20 | (2006.01) |
| G02B 27/00 | (2006.01) |

(52) U.S. Cl.
CPC ............ *H04N 5/2254* (2013.01); *G02B 3/04* (2013.01); *G02B 9/12* (2013.01); *G02B 13/0035* (2013.01); *G03B 17/14* (2013.01); *H04N 5/2253* (2013.01); *G02B 5/208* (2013.01); *G02B 27/0081* (2013.01)

(58) Field of Classification Search
CPC ...... H04N 5/2253; H04N 5/2254; G02B 3/04; G02B 9/12; G02B 13/0035; G02B 27/0081; G02B 5/20; G02B 5/208; G02B 5/288; G03B 17/14
See application file for complete search history.

(56) References Cited

U.S. PATENT DOCUMENTS

| | | | | |
|---|---|---|---|---|
| 7,948,692 | B2* | 5/2011 | Tang | G02B 13/04 359/716 |
| 8,570,667 | B2* | 10/2013 | Hsu | G02B 13/18 359/716 |
| 8,582,219 | B2* | 11/2013 | Tsai | G02B 13/0035 359/716 |
| 9,733,452 | B2* | 8/2017 | Lee | G02B 13/0035 |
| 2010/0202065 | A1* | 8/2010 | Tang | G02B 13/04 359/784 |
| 2012/0243109 | A1* | 9/2012 | Hsu | G02B 13/18 359/716 |
| 2012/0257288 | A1* | 10/2012 | Tsai | G02B 13/0035 359/716 |
| 2016/0205297 | A1* | 7/2016 | Chen | G02B 13/0035 348/335 |
| 2017/0192204 | A1* | 7/2017 | Lee | G02B 9/16 |

(Continued)

*Primary Examiner* — Twyler L Haskins
*Assistant Examiner* — Akshay Trehan
(74) *Attorney, Agent, or Firm* — Juan Carlos A. Marquez; Marquez IP Law Office, PLLC

(57) ABSTRACT

An optical lens assembly includes, in order from the object side to the image side: a stop, a first lens element, a second lens element, a third lens element, and an infrared bandpass filter. An entrance pupil diameter of the optical lens assembly is EPD, a half of a maximum field of view of the optical lens assembly is HFOV, and the following condition is satisfied: $0.59<EPD/\tan(HFOV)<1.33$.

20 Claims, 11 Drawing Sheets

(56) References Cited

U.S. PATENT DOCUMENTS

| | | | |
|---|---|---|---|
| 2017/0235097 A1* | 8/2017 | Tsai | G02B 5/208 359/356 |
| 2020/0124828 A1* | 4/2020 | Kang | H04N 5/232122 |
| 2022/0269042 A1* | 8/2022 | Wang | G03B 17/12 |

* cited by examiner

OPTICAL LENS ASSEMBLY AND PHOTOGRAPHING MODULE

CROSS-REFERENCE TO RELATED APPLICATION

This application claims the benefit of Taiwan Patent Application No. 110135430, filed on Sep. 23, 2021, which is hereby incorporated by reference for all purposes as if fully set forth herein.

BACKGROUND

Technical Field

The present disclosure relates to an optical lens assembly and a photographing module, and in particular, to an optical lens assembly and a photographing module applied to an electronic device.

Related Art

With the rapid development of photographing technologies, the demand for electronic devices equipped with an infrared optical lens assembly has increased because the infrared optical lens assembly can be used as a photographing module having time of flight (TOF) to calculate a distance between an object and a light source. Therefore, the infrared optical lens assembly can be applied to an infrared receiving module of a game console, a photographing module of a mobile phone, or a photographing module of an automobile.

In recent years, for an infrared optical lens assembly applied to a mobile phone, in order to facilitate portability, how to reduce the volume and weight of the optical lens assembly is particularly important. Unlike the past, to improve the imaging speed and resolution, a large optical aperture of an infrared optical lens assembly is also an important problem to be solved.

SUMMARY

The objective of the present disclosure is to solve the above defects such as a small optical aperture and a large volume of an optical lens assembly of a portable electronic device in the prior art. In order to achieve the above objective, the present disclosure provides an optical lens assembly, in order from an object side to an image side, comprising: a stop; a first lens with positive refractive power, comprising an object-side surface and an image-side surface, the image-side surface of the first lens being convex near an optical axis; a second lens with positive refractive power, comprising an object-side surface and an image-side surface, the object-side surface of the second lens being concave near an optical axis, and the image-side surface of the second lens being convex near an optical axis; a third lens with negative refractive power, comprising an object-side surface and an image-side surface, the object-side surface of the third lens being convex near an optical axis, the image-side surface of the third lens being concave near an optical axis, and one of the object-side surface and the image-side surface of the third lens is aspheric; and an IR band-pass filter;

An entrance pupil diameter of the optical lens assembly is EPD, half of a maximum field of view of the optical lens assembly is HFOV, and the following condition is satisfied: $0.59 < EPD/\tan(HFOV) < 1.33$. By properly configuring the entrance pupil diameter and the maximum field of view, a relationship between a short focal length and a large field of view can be effectively balanced.

Preferably, a total quantity of lenses with refractive power in the optical lens assembly is three.

Preferably, a radius of curvature of the object-side surface of the third lens is R5, and the following condition is satisfied: $1.05 < R5/EPD < 2.0$. By adjusting a relationship between a size of the lens and the optical aperture, a thinning optical lens assembly can be achieved.

Preferably, a radius of curvature of the object-side surface of the second lens is R3, a radius of curvature of the image-side surface of the second lens is R4, and the following condition is satisfied: $0.97 < R3/R4 < 1.72$. In this way, a spherical aberration and astigmatism of the optical lens assembly can be effectively reduced.

Preferably, a radius of curvature of the object-side surface of the third lens is R5, a radius of curvature of the image-side surface of the third lens is R6, and the following condition is satisfied: $1.2 < R5/R6 < 2.37$. In this way, a spherical aberration and astigmatism of the optical lens assembly can be effectively reduced.

Preferably, a focal length of the optical lens assembly is f, a focal length of the first lens is f1, and the following condition is satisfied: $0.3 < f/f1 < 0.8$. In this way, the proper distribution of the refractive power of the optical lens assembly is beneficial to correct an aberration of the optical lens assembly, so as to improve the imaging quality of the optical lens assembly.

Preferably, a focal length of the optical lens assembly is f, a focal length of the first lens is f1, a focal length of the third lens is f3, and the following condition is satisfied: $-2.8 < (f1+f3)/f < -0.32$. In this way, the configuration of the refractive power is adjusted to achieve a thinning optical lens assembly.

Preferably, a focal length of the third lens is f3, a central thickness of the third lens along the optical axis is CT3, and the following condition is satisfied: $-18.04 < f3/CT3 < -6.71$. By adjusting the central thickness of the third lens, the impact of a manufacturing tolerance on the imaging quality is reduced.

Preferably, a focal length of the optical lens assembly is f, a radius of curvature of the object-side surface of the second lens is R3, a radius of curvature of the image-side surface of the second lens is R4, and the following condition is satisfied: $2.27 < f/(R3*R4) < 4.98$. Adjusting a surface shape of the second lens is beneficial to correct an aberration of the optical lens assembly, so as to improve the imaging quality of the optical lens assembly.

Preferably, a focal length of the optical lens assembly is f, a radius of curvature of the object-side surface of the first lens is R1, an f-number of the optical lens assembly is Fno, and the following condition is satisfied: $-5.81 < (R1/f)+Fno < 7.23$. In this way, the proper distribution of the overall focal length of the lens assembly, the radius of curvature of the object-side surface of the first lens, and the f-number of the optical lens assembly is beneficial to shorten the focal length of the optical lens assembly.

Preferably, a central thickness of the first lens along the optical axis is CT1, a central thickness of the second lens along the optical axis is CT2, a distance from the image-side surface of the first lens to the object-side surface of the second lens along the optical axis is T12, and the following condition is satisfied: $1.92 < (CT1+CT2)/T12 < 11.85$. In this way, the proper distribution of the distance between the lenses along the optical axis is beneficial to correct an aberration of the optical lens assembly, so as to improve the imaging quality of the optical lens assembly.

Preferably, a focal length of the first lens is f1, a distance from the object-side surface of the first lens to the image-side surface of the third lens along the optical axis is TD, and the following condition is satisfied: $0.77<(f1*\sin(HFOV))/TD<2.36$. In this way, a maximum field of view can be effectively achieved under thinning optical lens assembly.

Preferably, a central thickness of the first lens along the optical axis is CT1, a central thickness of the second lens along the optical axis is CT2, and the following condition is satisfied: $0.60<CT1/CT2<1.54$. By balancing the central thicknesses of the first lens and the second lens, better lens formability can be achieved.

Preferably, a distance from the image-side surface of the third lens to the image plane along the optical axis is BFL, a distance from the image-side surface of the first lens to the object-side surface of the second lens along the optical axis is T12, a distance from the image-side surface of the second lens to the object-side surface of the third lens along the optical axis is T23, and the following condition is satisfied: $1.93<BFL/(T12+T23)<11.47$. In this way, the distances between the lenses along the optical axis can be effectively adjusted to reduce distortion and improve the imaging quality.

In addition, the present disclosure further provides a photographing module, comprising: a lens barrel; an optical lens assembly, disposed in the lens barrel; and an image sensor, disposed on an image plane of the optical lens assembly.

The optical lens assembly, in order from an object side to an image side, comprising: a stop; a first lens with positive refractive power, comprising an object-side surface and an image-side surface, wherein the image-side surface of the first lens being convex near an optical axis; a second lens with positive refractive power, comprising an object-side surface and an image-side surface, wherein the object-side surface of the second lens being concave near an optical axis, and the image-side surface of the second lens being convex near an optical axis; a third lens with negative refractive power, comprising an object-side surface and an image-side surface, wherein the object-side surface of the third lens being convex near an optical axis, the image-side surface of the third lens being concave near an optical axis, and one of the object-side surface and the image-side surface of the third lens is aspheric; and an IR band-pass filter.

An entrance pupil diameter of the optical lens assembly is EPD, half of a maximum field of view of the optical lens assembly is HFOV, and the following condition is satisfied: $0.59<EPD/\tan(HFOV)<1.33$. By properly configuring the entrance pupil diameter and the maximum field of view, a relationship between a short focal length and a large field of view can be effectively balanced.

Preferably, a total quantity of lenses with refractive power in the optical lens assembly is three.

Preferably, a radius of curvature of the object-side surface of the third lens is R5, and the following condition is satisfied: $1.05<R5/EPD<2.0$. By adjusting a relationship between a size of the lens and the optical aperture, a thinning optical lens assembly can be achieved.

Preferably, a radius of curvature of the object-side surface of the second lens is R3, a radius of curvature of the image-side surface of the second lens is R4, and the following condition is satisfied: $0.97<R3/R4<1.72$. In this way, a spherical aberration and astigmatism of the optical lens assembly can be effectively reduced.

Preferably, a radius of curvature of the object-side surface of the third lens is R5, a radius of curvature of the image-side surface of the third lens is R6, and the following condition is satisfied: $1.2<R5/R6<2.37$. In this way, a spherical aberration and astigmatism of the optical lens assembly can be effectively reduced.

Preferably, a focal length of the optical lens assembly is f, a focal length of the first lens is f1, and the following condition is satisfied: $0.3<f/f1<0.8$. In this way, the proper distribution of the refractive power of the optical lens assembly is beneficial to correct an aberration of the optical lens assembly, so as to improve the imaging quality of the optical lens assembly.

Preferably, a focal length of the optical lens assembly is f, a focal length of the first lens is f1, a focal length of the third lens is f3, and the following condition is satisfied: $-2.8<(f1+f3)/f<-0.32$. In this way, the configuration of the refractive power is adjusted to achieve a thinning optical lens assembly.

Preferably, a focal length of the third lens is f3, a central thickness of the third lens along the optical axis is CT3, and the following condition is satisfied: $-18.04<f3/CT3<-6.71$. By adjusting the central thickness of the third lens, the impact of a manufacturing tolerance on the imaging quality is reduced.

Preferably, a focal length of the optical lens assembly is f, a radius of curvature of the object-side surface of the second lens is R3, a radius of curvature of the image-side surface of the second lens is R4, and the following condition is satisfied: $2.27<f/(R3*R4)<4.98$. Adjusting a surface shape of the second lens is beneficial to correct an aberration of the optical lens assembly, so as to improve the imaging quality of the optical lens assembly.

Preferably, a focal length of the optical lens assembly is f, a radius of curvature of the object-side surface of the first lens is R1, an f-number of the optical lens assembly is Fno, and the following condition is satisfied: $-5.81<(R1/f)+Fno<7.23$. In this way, the proper distribution of the overall focal length of the lens assembly, the radius of curvature of the object-side surface of the first lens, and the f-number of the optical lens assembly is beneficial to shorten the focal length of the optical lens assembly.

Preferably, a central thickness of the first lens along the optical axis is CT1, a central thickness of the second lens along the optical axis is CT2, a distance from the image-side surface of the first lens to the object-side surface of the second lens along the optical axis is T12, and the following condition is satisfied: $1.92<(CT1+CT2)/T12<11.85$. In this way, the proper distribution of the distance between the lenses along the optical axis is beneficial to correct an aberration of the optical lens assembly, so as to improve the imaging quality of the optical lens assembly.

Preferably, a focal length of the first lens is f1, a distance from the object-side surface of the first lens to the image-side surface of the third lens along the optical axis is TD, and the following condition is satisfied: $0.77<(f1*\sin(HFOV))/TD<2.36$. In this way, a maximum field of view can be effectively achieved under thinning optical lens assembly.

Preferably, a central thickness of the first lens along the optical axis is CT1, a central thickness of the second lens along the optical axis is CT2, and the following condition is satisfied: $0.60<CT1/CT2<1.54$. By balancing the central thicknesses of the first lens and the second lens, better lens formability can be achieved.

Preferably, a distance from the image-side surface of the third lens to the image plane along the optical axis is BFL, a distance from the image-side surface of the first lens to the object-side surface of the second lens along the optical axis is T12, a distance from the image-side surface of the second lens to the object-side surface of the third lens along the optical axis is T23, and the following condition is satisfied: 1.93<BFL/(T12+T23)<11.47. In this way, the distances between the lenses along the optical axis can be effectively adjusted to reduce distortion and improve the imaging quality.

For each optical lens assembly or each photographing module, an entrance pupil diameter of the optical lens assembly is EPD, and the following condition is satisfied: 0.77<EPD<1.03.

For each optical lens assembly or each photographing module, an f-number of the optical lens assembly is Fno, and the following condition is satisfied: 1.44<Fno<1.96.

For each optical lens assembly or each photographing module, a maximum field of view in the optical lens assembly is FOV, and the following condition is satisfied: 72.27<FOV<107.91.

With the optical lens assembly and the photographing module of the present disclosure, effects of providing a thin infrared camera lens with a large optical aperture and maintaining a large image receiving angle can be achieved.

DETAILED DESCRIPTION

In order to enable persons with ordinary skills in the technical field to understand the content of the present disclosure and implement the content of the present disclosure, appropriate embodiments are described below with reference to the diagrams, and all equivalent replacements and modifications based on the content of the present disclosure are intended to be included within the scope of rights of the present disclosure. In addition, it is stated that the drawings attached to the present disclosure are not depicted in actual sizes. Although the present disclosure provides examples of specific parameters, it should be understood that parameters need not be completely equal to corresponding values. Within an acceptable error range, which is similar to its corresponding parameter, the embodiments below will further describe in detail the technical content of the present disclosure, but the disclosed content is not intended to limit the scope of rights of the present disclosure.

First Embodiment

Figure 1A:
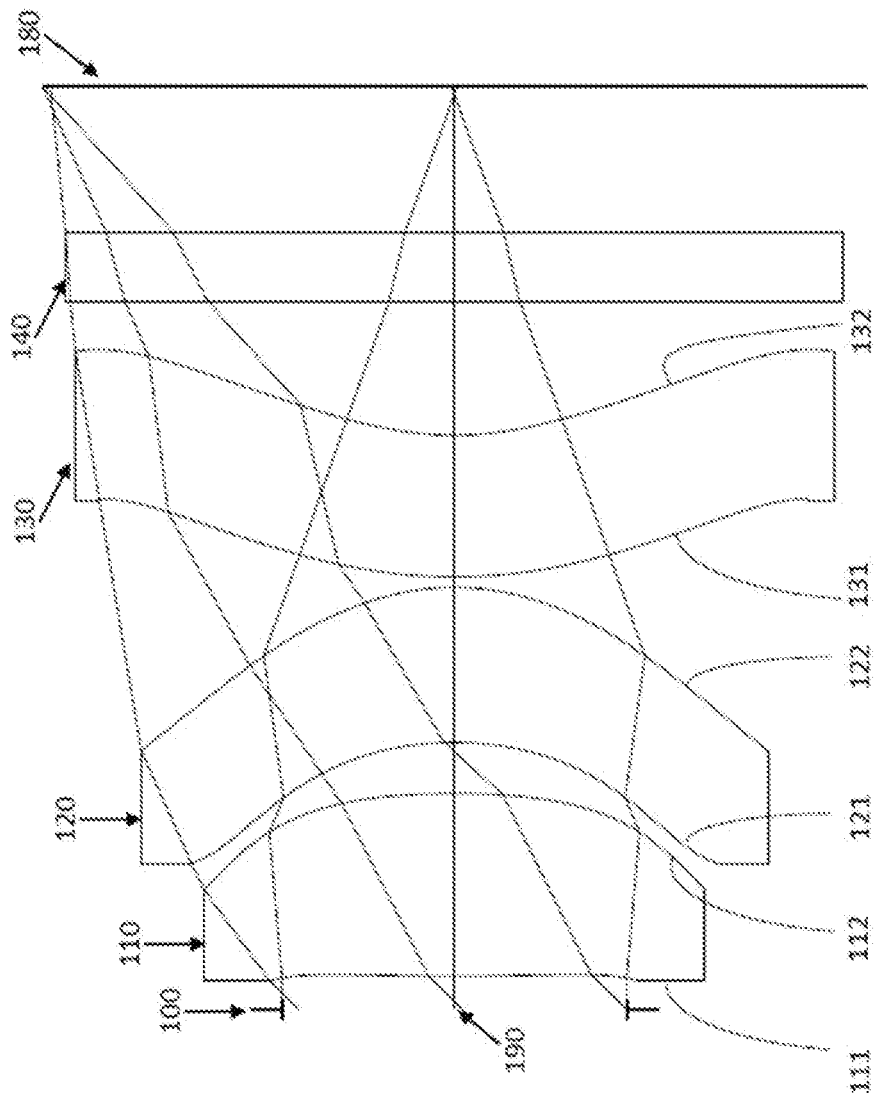
FIG. 1A is a schematic view of an optical lens assembly according to a first embodiment of the present disclosure.
Figure 1B:
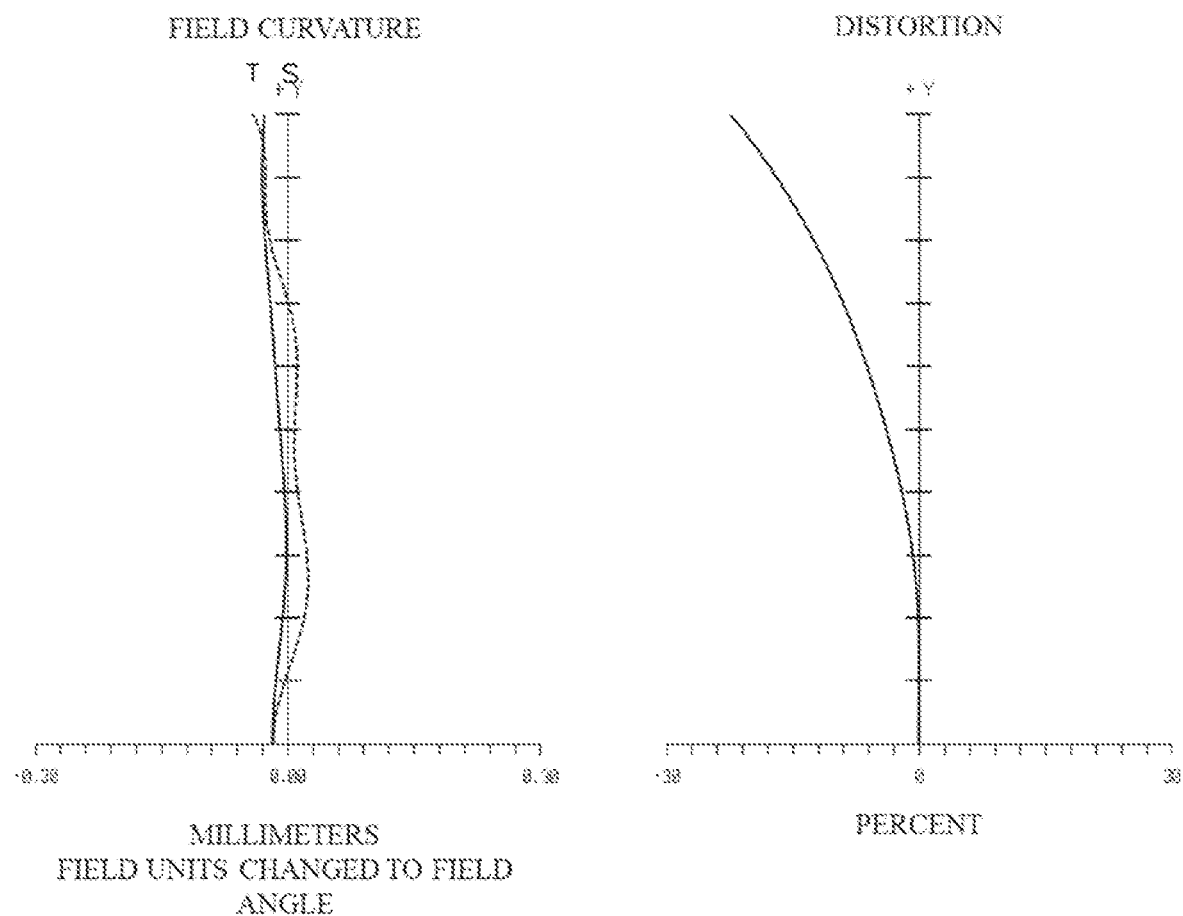
FIG. 1B shows a field curvature curves and a distortion curve of the optical lens assembly of the first embodiment.

Refer to FIG. 1A and FIG. 1B, where FIG. 1A is a schematic view of an optical lens assembly according to the first embodiment of the present disclosure, and FIG. 1B shows a field curvature curves and a distortion curve of the optical lens assembly of the first embodiment. As can be seen from FIG. 1A, the optical lens assembly includes, in order from an object side to an image side: a stop 100, a first lens 110, a second lens 120, a third lens 130, an infrared bandpass filter 140, and an image plane 180. A total quantity of lenses with refractive power in the optical lens assembly is three, but is not limited thereto.

The first lens 110 with positive refractive power includes an object-side surface 111 and an image-side surface 112, wherein the object-side surface 111 is convex near the optical axis 190, the image-side surface 112 is convex near the optical axis 190, and both the object-side surface 111 and the image-side surface 112 are aspheric.

The second lens 120 with positive refractive power includes an object-side surface 121 and an image-side surface 122, wherein the object-side surface 121 is concave near the optical axis 190, the image-side surface 122 is convex near the optical axis 190, and both the object-side surface 121 and the image-side surface 122 are aspheric.

The third lens 130 with negative refractive power includes an object-side surface 131 and an image-side surface 132, wherein the object-side surface 131 is convex near the optical axis 190, the image-side surface 132 is concave near the optical axis 190, and both the object-side surface 131 and the image-side surface 132 are aspheric.

The infrared bandpass filter 140 is disposed between the third lens 130 and the image plane 180 and does not affect a focal length of the optical lens assembly. In this embodiment, an optical filter is available in the light wavelength range of 940 nm±30 nm, but is not limited thereto.

An aspheric curve equation of the above-mentioned lenses is expressed as follows:

$$z(h) = \frac{ch^2}{1+[1-(k+1)c^2h^2]^{0.5}} + \sum (A_i) \cdot (h^i)$$

wherein, z is a position value in the direction of the optical axis 190 and with a surface vertex as a reference at a position of a height h; c is a curvature of a lens surface near the optical axis 190, and is a reciprocal of a radius of curvature (R) (c=1/R), R is a radius of curvature of a lens surface near the optical axis 190, h is a vertical distance between the lens surface and the optical axis 190, k is a conic constant, and Ai is an $i^{th}$ order aspheric coefficient.

In the first embodiment, a focal length of the optical lens assembly is f, an f-number of the optical lens assembly is Fno, and a maximum field of view (field of view 2ω) in the optical lens assembly is FOV, and values are as follows: f=1.50 (mm); Fno=1.62; and FOV=89.5 (degrees).

In the optical lens assembly of the first embodiment, an entrance pupil diameter of the optical lens assembly is EPD, a half of a maximum field of view of the optical lens assembly is HFOV, and the following condition is satisfied: EPD/tan(HFOV)=0.94.

In the optical lens assembly of the first embodiment, a radius of curvature of the object-side surface 131 of the third lens 130 is R5, and the following condition is satisfied: R5/EPD=1.34.

In the optical lens assembly of the first embodiment, a radius of curvature of the object-side surface 121 of the second lens 120 is R3, a radius of curvature of the image-side surface 122 of the second lens 120 is R4, and the following condition is satisfied: R3/R4=1.30.

In the optical lens assembly of the first embodiment, a radius of curvature of the object-side surface 131 of the third lens 130 is R5, a radius of curvature of the image-side surface 132 of the third lens 130 is R6, and the following condition is satisfied: R5/R6=1.67.

In the optical lens assembly of the first embodiment, a focal length of the optical lens assembly is f, a focal length of the first lens 110 is f1, and the following condition is satisfied: f/f1=0.63.

In the optical lens assembly of the first embodiment, a focal length of the optical lens assembly is f, a focal length of the first lens 110 is f1, a focal length of the third lens 130 is f3, and the following condition is satisfied: (f1+f3)/f=−1.41.

In the optical lens assembly of the first embodiment, a focal length of the third lens 130 is f3, a central thickness of the third lens 130 along the optical axis 190 is CT3, and the following condition is satisfied: f3/CT3=−10.49.

In the optical lens assembly of the first embodiment, a focal length of the optical lens assembly is f, a radius of curvature of the object-side surface 121 of the second lens 120 is R3, a radius of curvature of the image-side surface 122 of the second lens 120 is R4, and the following condition is satisfied: f/(R3*R4)=3.23.

In the optical lens assembly of the first embodiment, a focal length of the optical lens assembly is f, a radius of curvature of the object-side surface 111 of the first lens 110 is R1, f-number of the optical lens assembly is Fno, and the following condition is satisfied: (R1/f)+Fno=5.17.

In the optical lens assembly of the first embodiment, a central thickness of the first lens 110 along the optical axis 190 is CT1, a central thickness of the second lens 120 along the optical axis 190 is CT2, a distance from the image-side surface 111 of the first lens 110 to the object-side surface 122 of the second lens 120 along the optical axis 190 is T12, and the following condition is satisfied: (CT1+CT2)/T12=6.60.

In the optical lens assembly of the first embodiment, a focal length of the first lens 110 is f1, a distance from the object-side surface 111 of the first lens 110 to the image-side surface 132 of the third lens 130 along the optical axis 190 is TD, and the following condition is satisfied: (f1*sin(HFOV))=1.02.

In the optical lens assembly of the first embodiment, a central thickness of the first lens 110 along the optical axis 190 is CT1, a central thickness of the second lens 120 along the optical axis 190 is CT2, and the following condition is satisfied: CT1/CT2=1.18.

In the optical lens assembly of the first embodiment, a distance between the image-side surface 132 of the third lens 130 and the image plane 180 along the optical axis 190 is BFL, a distance from the image-side surface 111 of the first lens 110 to the object-side surface 122 of the second lens 120 along the optical axis 190 is T12, a distance from the image-side surface 121 of the second lens 120 to the object-side surface 132 of the third lens 130 along the optical axis 190 is T23, and the following condition is satisfied: BFL/(T12+T23)=5.67.

Refer to Table 1 and Table 2 below.

TABLE 1

First embodiment
f (focal length) = 1.50 mm, Fno (f-number) = 1.62, FOV (field of view 2ω) = 89.5 deg.

| Surface # | | Radius of curvature (mm) | Central thickness/ Distance (mm) | Refractive index (nd) | Dispersion coefficient (vd) | Focal length (mm) |
|---|---|---|---|---|---|---|
| 0 | Object | Infinity | 600.000 | | | |
| 1 | Stop | Infinity | 0.101 | | | |
| 2 | First lens | 5.333 (ASP) | 0.550 | 1.64 | 22.5 | 2.37 |
| 3 | | −1.940 (ASP) | 0.154 | | | |
| 4 | Second lens | −0.776 (ASP) | 0.468 | 1.64 | 22.5 | 2.10 |
| 5 | | −0.598 (ASP) | 0.032 | | | |
| 6 | Third lens | 1.244 (ASP) | 0.426 | 1.64 | 22.5 | −4.48 |
| 7 | | 0.746 (ASP) | 0.404 | | | |
| 8 | Infrared bandpass filter | Infinity | 0.210 | 1.52 | 64.2 | |
| 9 | | Infinity | 0.440 | | | |
| 10 | Image plane | Infinity | — | | | |

Reference wavelength 940 nm

TABLE 2

Aspheric coefficient

| Surface # | 2 | 3 | 4 | 5 | 6 | 7 |
|---|---|---|---|---|---|---|
| K: | 7.9772E+01 | 5.0422E+00 | −5.4837E−01 | −1.2447E+00 | −2.9453E+00 | −5.4642E+00 |
| A2: | 0.0000E+00 | 0.0000E+00 | 0.0000E+00 | 0.0000E+00 | 0.0000E+00 | 0.0000E+00 |
| A4: | −4.4227E−01 | −4.5988E−01 | −3.3391E−01 | 3.9894E−01 | 1.5457E−02 | −1.8645E−02 |
| A6: | −2.8428E+00 | −3.5085E+00 | −4.8385E+00 | −3.0721E+00 | −8.5939E−02 | −1.7223E−02 |
| A8: | 6.5864E+01 | 2.4380E+01 | 3.6090E+01 | 1.1540E+01 | −6.5602E−03 | 2.3658E−01 |
| A10: | −7.2280E+02 | −9.9911E+01 | −1.3119E+02 | −2.4526E+01 | 4.3650E−01 | −8.7879E−01 |
| A12: | 3.8696E+03 | 2.2831E+02 | 2.8391E+02 | 3.2292E+01 | −1.3545E+00 | 1.0718E+00 |

TABLE 2-continued

Aspheric coefficient

| Surface # | 2 | 3 | 4 | 5 | 6 | 7 |
|---|---|---|---|---|---|---|
| A14: | −1.0532E+04 | −2.7084E+02 | −3.0461E+02 | −2.4200E+01 | 1.4822E+00 | −5.9933E−01 |
| A16: | 1.1399E+04 | 1.4264E+02 | 1.2087E+02 | 7.7360E+00 | −5.9092E−01 | 1.2620E−01 |

Table 1 shows detailed configuration data of the first embodiment in FIG. 1A. Units of a radius of curvature, a central thickness, a distance, and a focal length are mm, and surfaces 0-10 sequentially represent surfaces from an object side to an image side, where the surface 0 is a gap between an object and the stop 100 along the optical axis 190; the surface 1 is a gap between the stop 100 and the object-side surface 111 of the first lens 110 along the optical axis 190, and the stop 100 is closer to the object side than the object-side surface 111 of the first lens 110 is, and therefore is represented by a positive value; the surfaces 2, 4, 6, and 8 are respectively central thicknesses of the first lens 110, the second lens 120, the third lens 130, and the infrared bandpass filter 140 along the optical axis 190; and the surfaces 3, 5, 7, and 9 are respectively distance from the image-side surface 112 of the first lens 110 to the object-side surface 121 of the second lens 120 along the optical axis 190, a distance from the image-side surface 122 of the second lens 120 to the object-side surface 131 of the third lens 130 along the optical axis 190, a distance from the image-side surface 132 of the third lens 130 and the infrared bandpass filter 140 along the optical axis 190, and a distance from the infrared bandpass filter 140 to the image plane 180 along the optical axis 190.

Table 2 shows aspheric data in the first embodiment, where k represents a conical surface coefficient in the aspheric curve equation, and A2, A4, A6, A8, A10, A12, A14, and A16 are high-order aspheric coefficients. In addition, the following tables of embodiments are schematic views and aberration curves corresponding to the embodiments, and the definitions of data in the tables of the embodiments are the same as the definitions in Table 1 and Table 2 of the first embodiment, and are not repeated herein.

Second Embodiment

Figure 2A:
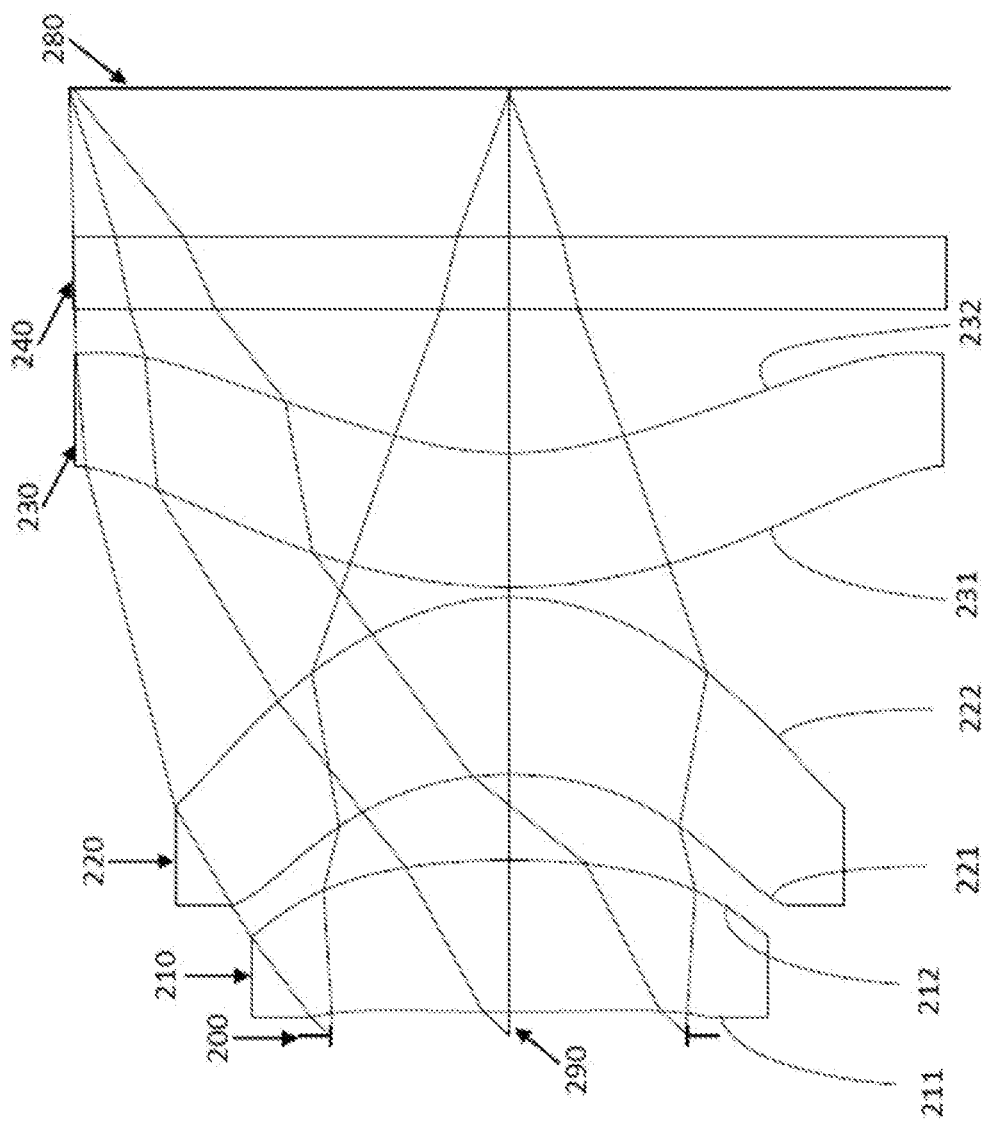
FIG. 2A is a schematic view of an optical lens assembly according to a second embodiment of the present disclosure.
Figure 2B:
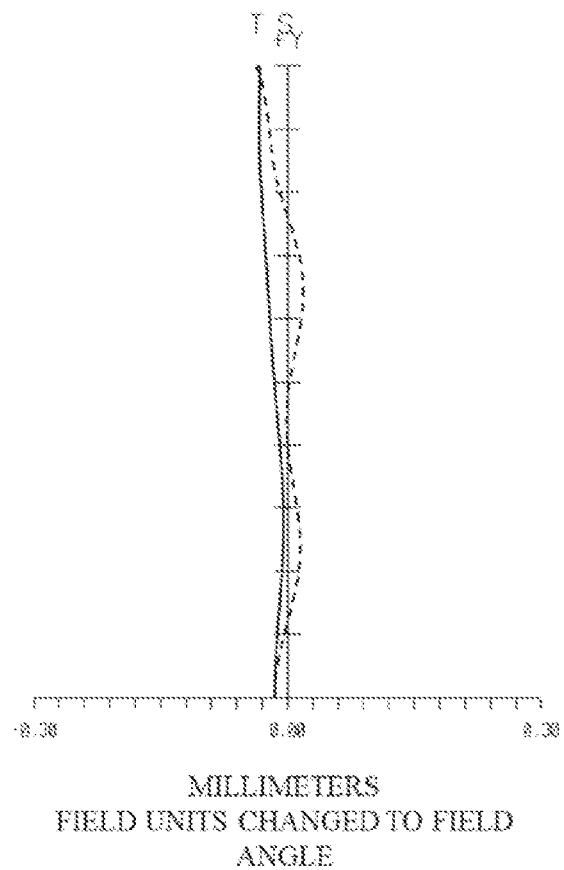
FIG. 2B shows a field curvature curves and a distortion curve of the optical lens assembly of the second embodiment.
Figure 2B:
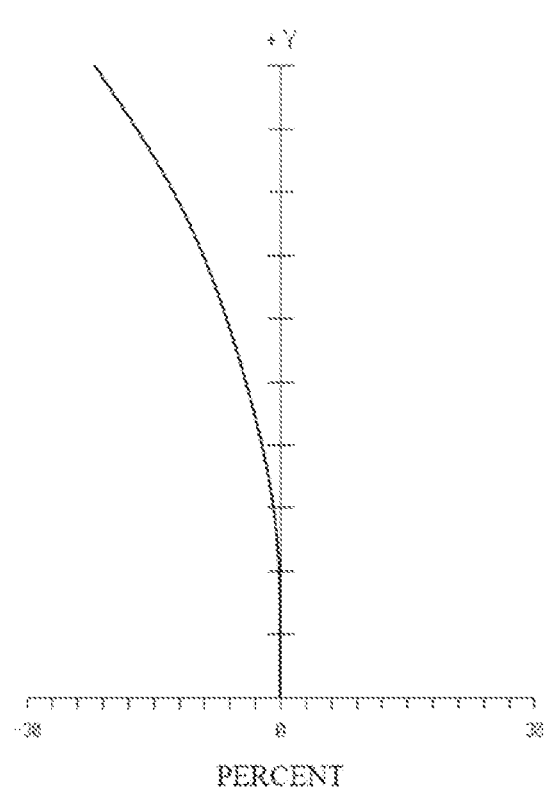

Refer to FIG. 2A and FIG. 2B, where FIG. 2A is a schematic view of an optical lens assembly according to the second embodiment of the present disclosure, and FIG. 2B shows a field curvature curve and a distortion curve of the optical lens assembly of the second embodiment. As can be seen from FIG. 2A, the optical lens assembly includes, in order from an object side to an image side: a stop 200, a first lens 210, a second lens 220, a third lens 230, an infrared bandpass filter 240, and an image plane 280. A total quantity of lenses with refractive power in the optical lens assembly is three, but is not limited thereto.

The first lens 210 with positive refractive power includes an object-side surface 211 and an image-side surface 212, wherein the object-side surface 211 is convex near the optical axis 290, the image-side surface 212 is convex near the optical axis 290, and both the object-side surface 211 and the image-side surface 212 are aspheric.

The second lens 220 with positive refractive power includes an object-side surface 221 and an image-side surface 222, wherein the object-side surface 221 is concave near the optical axis 290, the image-side surface 222 is convex near the optical axis 290, and both the object-side surface 221 and the image-side surface 222 are aspheric.

The third lens 230 with a negative refractive power includes an object-side surface 231 and an image-side surface 232, wherein the object-side surface 231 is convex near the optical axis 290, the image-side surface 232 is concave near the optical axis 290, and both the object-side surface 231 and the image-side surface 232 are aspheric.

The infrared bandpass filter 240 is disposed between the third lens 230 and the image plane 280 and does not affect a focal length of the optical lens assembly. In this embodiment, an optical filter is available in the light wavelength range of 940 nm±30 nm, but is not limited thereto.

Refer to Table 3 and Table 4 below.

TABLE 3

Second embodiment
f (focal length) = 1.50 mm, Fno (f-number) = 1.605, FOV (field of view 2ω) = 84.8 deg.

| Surface # | | Radius of curvature (mm) | Central thickness/ Distance (mm) | Refractive index (nd) | Dispersion coefficient (vd) | Focal length (mm) |
|---|---|---|---|---|---|---|
| 0 | Object | Infinity | 600.000 | | | |
| 1 | Stop | Infinity | 0.072 | | | |
| 2 | First lens | 6.627 (ASP) | 0.447 | 1.64 | 22.5 | 2.43 |
| 3 | | −1.894 (ASP) | 0.251 | | | |
| 4 | Second lens | −0.730 (ASP) | 0.521 | 1.64 | 22.5 | 1.89 |
| 5 | | −0.572 (ASP) | 0.031 | | | |
| 6 | Third lens | 1.227 (ASP) | 0.394 | 1.64 | 22.5 | −4.54 |
| 7 | | 0.749 (ASP) | 0.427 | | | |
| 8 | Infrared bandpass filter | Infinity | 0.210 | 1.52 | 64.2 | |
| 9 | | Infinity | 0.440 | | | |
| 10 | Image plane | Infinity | — | | | |

Reference wavelength 940 nm

TABLE 4

Aspheric coefficient

| Surface # | 2 | 3 | 4 | 5 | 6 | 7 |
|---|---|---|---|---|---|---|
| K: | 1.0002E+02 | −1.2333E−01 | −9.3836E−01 | −1.3036E+00 | −3.4087E+00 | −6.1217E+00 |
| A2: | 0.0000E+00 | 0.0000E+00 | 0.0000E+00 | 0.0000E+00 | 0.0000E+00 | 0.0000E+00 |
| A4: | −4.7304E−01 | −2.4665E−01 | −1.4833E−01 | 3.8222E−01 | 4.6867E−02 | −2.8565E−02 |
| A6: | 7.4800E−01 | −2.5757E+00 | −4.1258E+00 | −3.0684E+00 | −2.3989E−02 | 1.2401E−01 |
| A8: | −1.1206E+00 | 1.4702E+01 | 2.5183E+01 | 9.9821E+00 | 9.6030E−02 | −7.2887E−02 |
| A10: | −4.8067E+01 | −4.1226E+01 | −7.8440E+01 | −2.0130E+01 | −1.7531E−01 | −1.9850E−01 |
| A12: | 2.6891E+02 | 3.7904E+01 | 1.3914E+02 | 2.3980E+01 | −2.0338E−02 | 1.7971E−01 |
| A14: | −6.3814E+02 | 3.0858E+01 | −1.1108E+02 | −1.4661E+01 | 1.4038E−01 | −2.0396E−02 |
| A16: | 5.4021E+02 | −5.0135E+01 | 2.4345E+01 | 3.5133E+00 | −5.6530E−02 | −1.2935E−02 |

In the second embodiment, an aspheric curve equation is expressed as the form in the first embodiment. In addition, definitions of parameters in the table below are the same as the definitions in the first embodiment, and are not repeated herein.

With reference to Table 3 and Table 4, the following data can be calculated:

| Second embodiment | | | |
|---|---|---|---|
| f(mm) | 1.50 | (f1 + f3)/f | −1.41 |
| EPD | 0.93 | f3/CT3 | −11.51 |
| Fno | 1.61 | f/(R3*R4) | 3.59 |
| FOV | 84.80 | (R1/f) + Fno | 6.02 |
| EPD/tan(HFOV) | 1.02 | (CT1 + CT2)/T12 | 3.85 |
| R5/EPD | 1.31 | (f1*sin(HFOV))/TD | 1.00 |
| R3/R4 | 1.28 | CT1/CT2 | 0.86 |
| R5/R6 | 1.64 | BFL/(T12 + T23) | 3.81 |
| f/f1 | 0.62 | | |

Third Embodiment

Figure 3A:
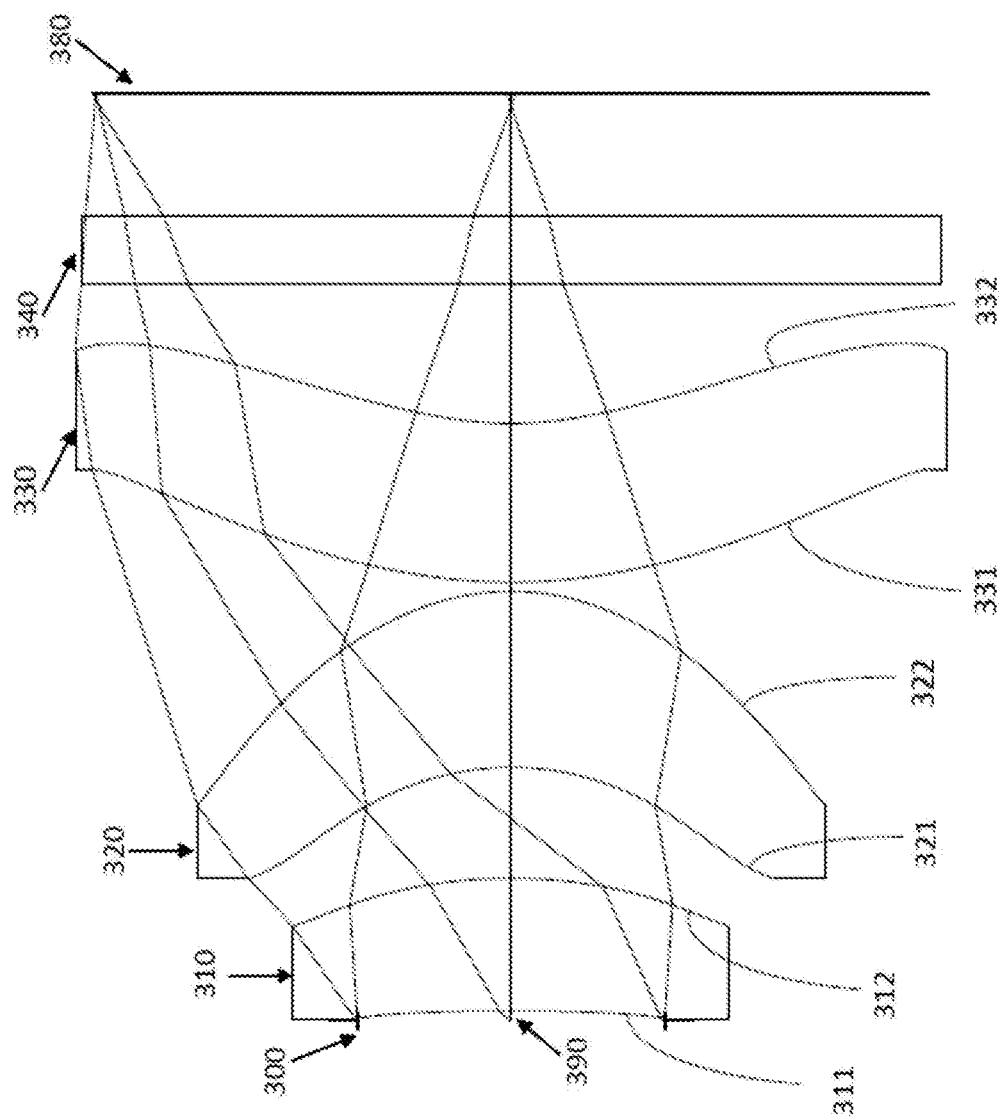
FIG. 3A is a schematic view of an optical lens assembly according to a third embodiment of the present disclosure.
Figure 3B:
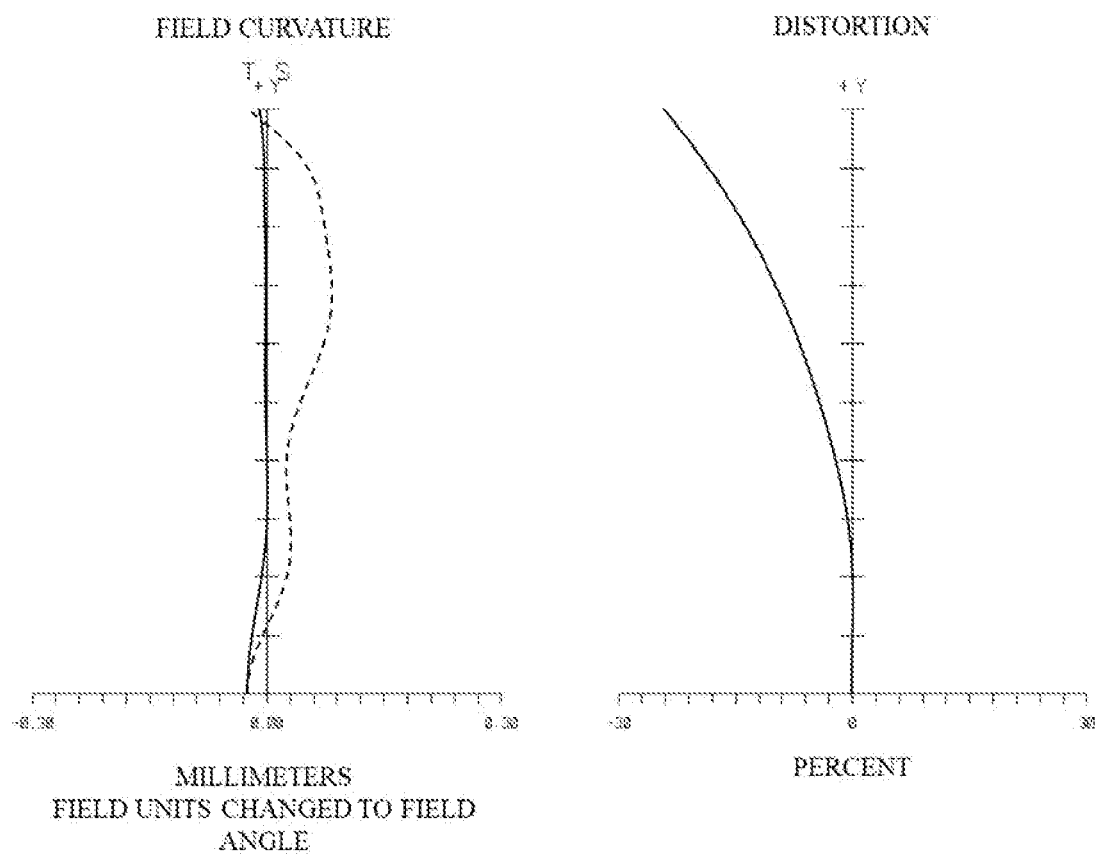
FIG. 3B shows a field curvature curves and a distortion curve of the optical lens assembly of the third embodiment.

Refer to FIG. 3A and FIG. 3B, where FIG. 3A is a schematic view of an optical lens assembly according to the second embodiment of the present disclosure, and FIG. 3B shows a field curvature curve and a distortion curve of the optical lens assembly of the second embodiment. As can be seen from FIG. 3A, the optical lens assembly includes, in order from an object side to an image side: a stop 300, a first lens 310, a second lens 320, a third lens 330, an infrared bandpass filter 340, and an image plane 380. A total quantity of lenses with refractive power in the optical lens assembly is three, but is not limited thereto.

The first lens 310 with positive refractive power includes an object-side surface 311 and an image-side surface 312, wherein the object-side surface 311 is concave near the optical axis 390, the image-side surface 312 is convex near the optical axis 390, and both the object-side surface 311 and the image-side surface 312 are aspheric.

The second lens 320 with positive refractive power includes an object-side surface 321 and an image-side surface 322, wherein the object-side surface 321 is concave near the optical axis 390, the image-side surface 322 is convex near the optical axis 390, and both the object-side surface 321 and the image-side surface 322 are aspheric.

The third lens 330 with a negative refractive power includes an object-side surface 331 and an image-side surface 332, wherein the object-side surface 331 is convex near the optical axis 390, the image-side surface 332 is concave near the optical axis 390, and both the object-side surface 331 and the image-side surface 332 are aspheric.

The infrared bandpass filter 340 is disposed between the third lens 330 and the image plane 380 and does not affect a focal length of the optical lens assembly. In this embodiment, an optical filter is available in the light wavelength range of 940 nm±30 nm, but is not limited thereto.

Refer to Table 5 and Table 6 below.

TABLE 5

Third embodiment
f (focal length) = 1.45 mm, Fno (f-number) = 1.704, FOV (field of view 2ω) = 92 deg.

| Surface # | | Radius of curvature (mm) | Central thickness/ Distance (mm) | Refractive index (nd) | Dispersion coefficient (vd) | Focal length (mm) |
|---|---|---|---|---|---|---|
| 0 | Object | Infinity | 600.000 | | | |
| 1 | Stop | Infinity | 0.030 | | | |
| 2 | First lens | −9.491 (ASP) | 0.411 | 1.64 | 22.5 | 2.45 |
| 3 | | −1.331 (ASP) | 0.342 | | | |
| 4 | Second lens | −0.705 (ASP) | 0.546 | 1.64 | 22.5 | 1.97 |
| 5 | | −0.579 (ASP) | 0.028 | | | |
| 6 | Third lens | 1.390 (ASP) | 0.490 | 1.64 | 22.5 | −5.84 |
| 7 | | 0.869 (ASP) | 0.429 | | | |
| 8 | Infrared bandpass filter | Infinity | 0.210 | 1.52 | 64.2 | |
| 9 | | Infinity | 0.380 | | | |
| 10 | Image plane | Infinity | — | | | |

Reference wavelength 940 nm

TABLE 6

| Aspheric coefficient | | | | | | |
|---|---|---|---|---|---|---|
| Surface # | 2 | 3 | 4 | 5 | 6 | 7 |
| K: | −2.5001E+02 | −3.1130E+00 | −1.3915E+00 | −1.1263E+00 | −5.5446E+00 | −7.8586E+00 |
| A2: | 0.0000E+00 | 0.0000E+00 | 0.0000E+00 | 0.0000E+00 | 0.0000E+00 | 0.0000E+00 |
| A4: | −3.6572E−01 | −1.4089E−01 | −1.1162E−01 | 3.8258E−01 | 6.5568E−02 | −3.2660E−02 |
| A6: | −1.9669E−01 | −2.9359E+00 | −4.5526E+00 | −2.9985E+00 | −2.9560E−02 | −1.1780E−03 |
| A8: | 6.7462E+00 | 1.7118E+01 | 2.7317E+01 | 9.8870E+00 | 9.0554E−02 | 1.2820E−01 |
| A10: | −8.0306E+01 | −4.0489E+01 | −7.8622E+01 | −2.0330E+01 | −1.4690E−01 | −2.5638E−01 |
| A12: | 2.4326E+02 | 3.4122E+01 | 1.3529E+02 | 2.3953E+01 | 3.2736E−03 | 1.4836E−01 |
| A14: | −8.0536E+01 | 3.0840E+01 | −1.1701E+02 | −1.4309E+01 | 9.9449E−02 | −1.2621E−02 |
| A16: | 2.6877E+02 | −3.4618E+01 | 3.4890E+01 | 3.4159E+00 | −4.4521E−02 | −9.4853E−03 |

In the third embodiment, an aspheric curve equation is expressed as the form in the first embodiment. In addition, definitions of parameters in the table below are the same as the definitions in the first embodiment, and are not repeated herein.

With reference to Table 5 and Table 6, the following data can be calculated:

| Third embodiment | | | |
|---|---|---|---|
| f(mm) | 1.45 | (f1 + f3)/f | −2.33 |
| EPD | 0.85 | f3/CT3 | −11.91 |
| Fno | 1.70 | f/(R3*R4) | 3.55 |
| FOV | 92.00 | (R1/f) + Fno | −4.84 |
| EPD/tan(HFOV) | 0.82 | (CT1 + CT2)/T12 | 2.80 |
| R5/EPD | 1.63 | (f1*sin(HFOV))/TD | 0.97 |
| R3/R4 | 1.22 | CT1/CT2 | 0.75 |
| R5/R6 | 1.60 | BFL/(T12 + T23) | 2.76 |
| f/f1 | 0.59 | | |

Fourth Embodiment

Figure 4A:
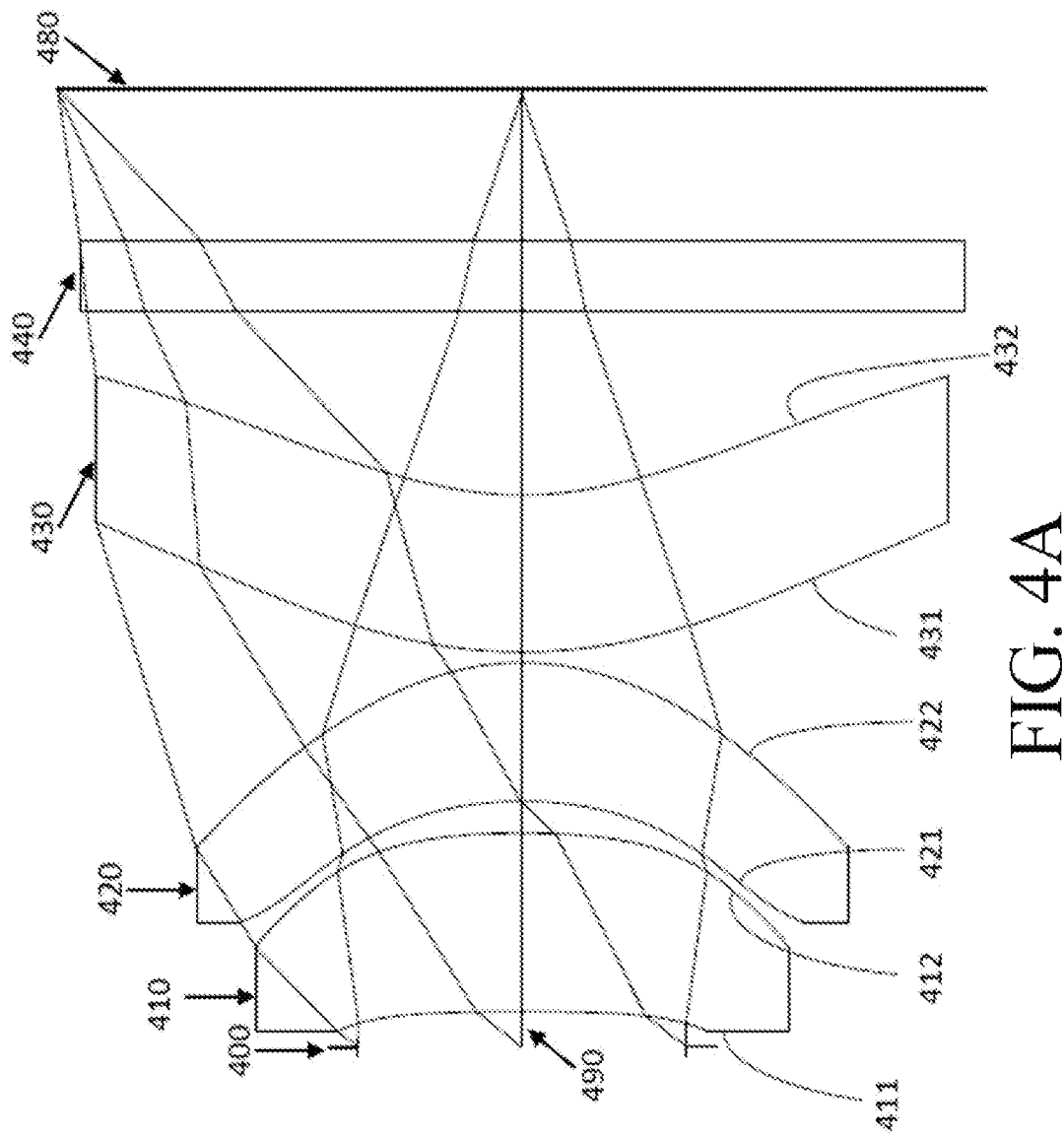
FIG. 4A is a schematic view of an optical lens assembly according to a fourth embodiment of the present disclosure.
Figure 4B:
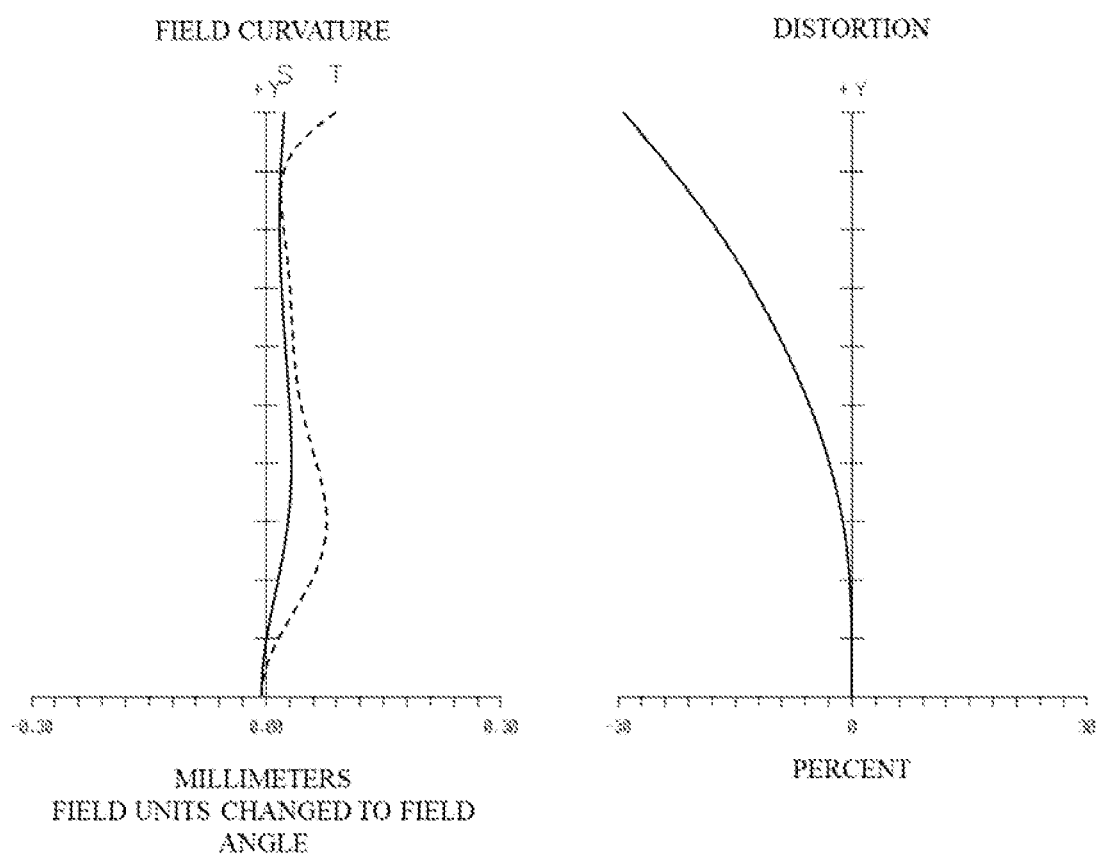
FIG. 4B shows a field curvature curves and a distortion curve of the optical lens assembly of the fourth embodiment.

Refer to FIG. 4A and FIG. 4B, where FIG. 4A is a schematic view of an optical lens assembly according to the second embodiment of the present disclosure, and FIG. 4B shows a field curvature curve and a distortion curve of the optical lens assembly of the second embodiment. As can be seen from FIG. 4A, the optical lens assembly includes, in order from an object side to an image side: a stop 400, a first lens 410, a second lens 420, a third lens 430, an infrared bandpass filter 440, and an image plane 480. A total quantity of lenses with refractive power in the optical lens assembly is three, but is not limited thereto.

The first lens 410 with positive refractive power includes an object-side surface 411 and an image-side surface 412, wherein the object-side surface 411 is concave near the optical axis 490, the image-side surface 412 is convex near the optical axis 490, and both the object-side surface 411 and the image-side surface 412 are aspheric.

The second lens 420 with positive refractive power includes an object-side surface 421 and an image-side surface 422, wherein the object-side surface 421 is concave near the optical axis 490, the image-side surface 422 is convex near the optical axis 490, and both the object-side surface 421 and the image-side surface 422 are aspheric.

The third lens 430 with a negative refractive power includes an object-side surface 431 and an image-side surface 432, wherein the object-side surface 431 is convex near the optical axis 490, the image-side surface 432 is concave near the optical axis 490, and both the object-side surface 431 and the image-side surface 432 are aspheric.

The infrared bandpass filter 440 is disposed between the third lens 430 and the image plane 480 and does not affect a focal length of the optical lens assembly. In this embodiment, an optical filter is available in the light wavelength range of 940 nm±30 nm, but is not limited thereto.

Refer to Table 7 and Table 8 below.

TABLE 7

| Fourth embodiment f (focal length) = 1.48 mm, Fno (f-number) = 1.736, FOV (field of view 2ω) = 98.1 deg. | | | | | |
|---|---|---|---|---|---|
| Surface # | | Radius of curvature (mm) | Central thickness/ Distance (mm) | Refractive index (nd) | Dispersion coefficient (vd) | Focal length (mm) |
| 0 | Object | Infinity | 600.000 | | | |
| 1 | Stop | Infinity | 0.105 | | | |
| 2 | First lens | −6.702 (ASP) | 0.519 | 1.64 | 22.5 | 3.92 |
| 3 | | −1.835 (ASP) | 0.093 | | | |
| 4 | Second lens | −0.864 (ASP) | 0.404 | 1.64 | 22.5 | 2.03 |
| 5 | | −0.604 (ASP) | 0.030 | | | |
| 6 | Third lens | 1.194 (ASP) | 0.458 | 1.64 | 22.5 | −6.88 |
| 7 | | 0.796 (ASP) | 0.534 | | | |
| 8 | Infrared bandpass filter | Infinity | 0.210 | 1.52 | 64.2 | |
| 9 | | Infinity | 0.440 | | | |
| 10 | Image plane | Infinity | — | | | |

Reference wavelength 940 nm

TABLE 8

| Aspheric coefficient | | | | | | |
|---|---|---|---|---|---|---|
| Surface # | 2 | 3 | 4 | 5 | 6 | 7 |
| K: | −7.5903E+00 | 5.7674E+00 | −6.1713E−01 | −1.3080E+00 | −2.2423E+00 | −6.1692E+00 |
| A2: | 0.0000E+00 | 0.0000E+00 | 0.0000E+00 | 0.0000E+00 | 0.0000E+00 | 0.0000E+00 |
| A4: | −4.3466E−01 | −5.6600E−01 | −2.9255E−01 | 3.9774E−01 | 4.3672E−02 | 5.9806E−02 |
| A6: | −2.6560E−01 | −2.8003E+00 | −4.0403E+00 | −2.9620E+00 | −1.1575E−01 | 2.0504E−02 |
| A8: | −1.7066E+00 | 1.5125E+01 | 2.5224E+01 | 1.0214E+01 | 1.0725E−01 | −1.0321E−01 |
| A10: | −4.8790E+01 | −3.9308E+01 | −7.7944E+01 | −2.0227E+01 | −1.3366E−01 | −1.3911E−01 |
| A12: | 2.5639E+02 | 3.9777E+01 | 1.4137E+02 | 2.3287E+01 | −1.6862E−02 | 2.2176E−01 |
| A14: | −6.5374E+02 | 2.8113E+01 | −1.0865E+02 | −1.5402E+01 | 1.7011E−01 | −3.1317E−02 |
| A16: | 8.0111E+02 | −4.3664E+01 | 1.2058E+01 | 4.9324E+00 | −8.2121E−02 | −2.8301E−02 |

In the fourth embodiment, an aspheric curve equation is expressed as the form in the first embodiment. In addition, definitions of parameters in the table below are the same as the definitions in the first embodiment, and are not repeated herein.

With reference to Table 7 and Table 8, the following data can be calculated:

| Fourth embodiment | | | |
|---|---|---|---|
| f(mm) | 1.48 | (f1 + f3)/f | −2.00 |
| EPD | 0.85 | f3/CT3 | −15.03 |
| Fno | 1.74 | f/(R3*R4) | 2.84 |
| FOV | 98.10 | (R1/f) + Fno | −2.79 |
| EPD/tan(HFOV) | 0.74 | (CT1 + CT2)/T12 | 9.87 |
| R5/EPD | 1.40 | (f1*sin(HFOV))/TD | 1.97 |
| R3/R4 | 1.43 | CT1/CT2 | 1.29 |
| R5/R6 | 1.50 | BFL/(T12 + T23) | 9.56 |
| f/f1 | 0.38 | | |

Fifth Embodiment

Figure 5A:
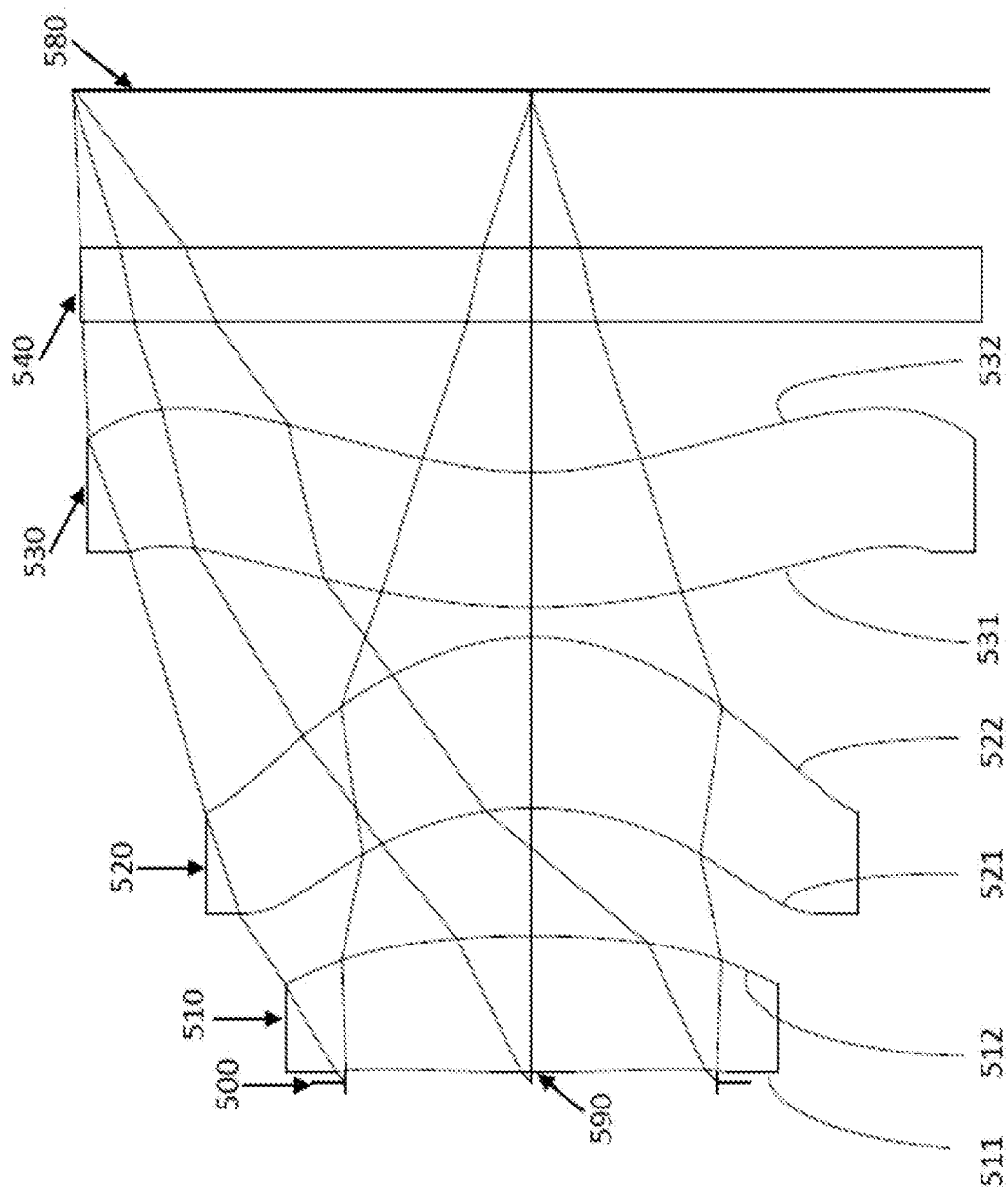
FIG. 5A is a schematic view of an optical lens assembly according to a fifth embodiment of the present disclosure.
Figure 5B:
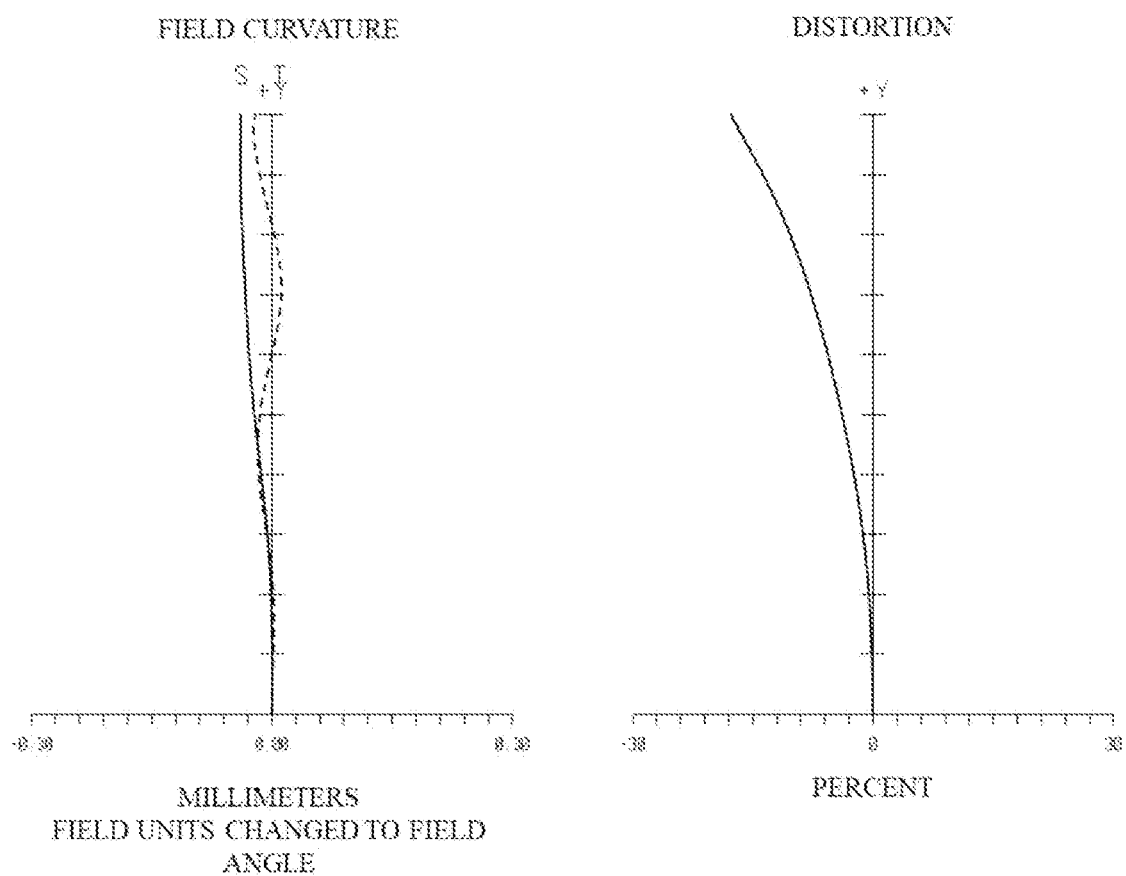
FIG. 5B shows a field curvature curves and a distortion curve of the optical lens assembly of the fifth embodiment.

Refer to FIG. 5A and FIG. 5B, where FIG. 5A is a schematic view of an optical lens assembly according to the fifth embodiment of the present disclosure, and FIG. 5B shows a field curvature curve and a distortion curve of the optical lens assembly of the fifth embodiment. As can be seen from FIG. 5A, the optical lens assembly includes, in order from an object side to an image side: a stop 500, a first lens 510, a second lens 520, a third lens 530, an infrared bandpass filter 540, and an image plane 580. A total quantity of lenses with refractive power in the optical lens assembly is three, but is not limited thereto.

The first lens 510 with positive refractive power includes an object-side surface 511 and an image-side surface 512, wherein the object-side surface 511 is convex near the optical axis 590, the image-side 512 surface is convex near the optical axis 590, and both the object-side surface 511 and the image-side surface 512 are aspheric.

The second lens 520 with positive refractive power includes an object-side surface 521 and an image-side surface 522, wherein the object-side surface 521 is concave near the optical axis 590, the image-side surface 522 is convex near the optical axis 590, and both the object-side surface 521 and the image-side surface 522 are aspheric.

The third lens 530 with a negative refractive power includes an object-side surface 531 and an image-side surface 532, wherein the object-side surface 531 is convex near the optical axis 590, the image-side surface 232 is concave near the optical axis 290, and both the object-side surface 531 and the image-side surface 532 are aspheric.

The infrared bandpass filter 540 is disposed between the third lens 530 and the image plane 580 and does not affect a focal length of the optical lens assembly. In this embodiment, an optical filter is available in the light wavelength range of 940 nm±30 nm, but is not limited thereto.

Refer to Table 9 and Table 10 below.

TABLE 9

Fifth embodiment
f (focal length) = 1.67 mm, Fno (f-number) = 1.786, FOV (field of view 2ω) = 80.3 deg.

| Surface # | | Radius of curvature (mm) | Central thickness/ Distance (mm) | Refractive index (nd) | Dispersion coefficient (vd) | Focal length (mm) |
|---|---|---|---|---|---|---|
| 0 | Object | Infinity | 600.000 | | | |
| 1 | Stop | Infinity | 0.030 | | | |
| 2 | First lens | 4.611 (ASP) | 0.385 | 1.64 | 22.5 | 2.51 |
| 3 | | −2.273 (ASP) | 0.361 | | | |
| 4 | Second lens | −0.733 (ASP) | 0.481 | 1.64 | 22.5 | 1.76 |
| 5 | | −0.549 (ASP) | 0.085 | | | |
| 6 | Third lens | 1.558 (ASP) | 0.379 | 1.64 | 22.5 | −3.18 |
| 7 | | 0.789 (ASP) | 0.426 | | | |
| 8 | Infrared bandpass filter | Infinity | 0.210 | 1.52 | 64.2 | |
| 9 | | Infinity | 0.440 | | | |
| 10 | Image plane | Infinity | — | | | |

Reference wavelength 940 nm

TABLE 10

| Surface # | Aspheric coefficient | | | | | |
| --- | --- | --- | --- | --- | --- | --- |
| | 2 | 3 | 4 | 5 | 6 | 7 |
| K: | 5.6115E+01 | −2.7655E+00 | −1.1663E+00 | −1.3310E+00 | −5.6487E+00 | −7.4883E+00 |
| A2: | 0.0000E+00 | 0.0000E+00 | 0.0000E+00 | 0.0000E+00 | 0.0000E+00 | 0.0000E+00 |
| A4: | −4.6416E−01 | −1.7854E−01 | −6.8049E−02 | 3.8155E−01 | 1.6697E−02 | −1.1881E−01 |
| A6: | 4.4819E−01 | −2.7598E+00 | −4.1305E+00 | −3.0098E+00 | −5.0273E−02 | 9.5878E−02 |
| A8: | 4.0168E−01 | 1.5928E+01 | 2.6357E+01 | 1.0077E+01 | 8.9934E−02 | −2.8623E−02 |
| A10: | −5.3396E+01 | −4.2165E+01 | −7.7782E+01 | −2.0085E+01 | −1.7843E−01 | −2.0784E−01 |
| A12: | 2.6583E+02 | 3.0806E+01 | 1.3663E+02 | 2.4052E+01 | −2.6984E−02 | 1.6354E−01 |
| A14: | −4.9036E+02 | 3.4006E+01 | −1.1688E+02 | −1.4326E+01 | 1.2727E−01 | −2.2400E−02 |
| A16: | 1.8977E+02 | −1.2080E+01 | 3.2342E+01 | 3.4967E+00 | −5.4431E−02 | −8.7064E−03 |

In the fifth embodiment, an aspheric curve equation is expressed as the form in the first embodiment. In addition, definitions of parameters in the table below are the same as the definitions in the first embodiment, and are not repeated herein.

With reference to Table 9 and Table 10, the following data can be calculated:

| Fifth embodiment | | | |
| --- | --- | --- | --- |
| f(mm) | 1.67 | (f1 + f3)/f | −0.40 |
| EPD | 0.93 | f3/CT3 | −8.39 |
| Fno | 1.79 | f/(R3*R4) | 4.15 |
| FOV | 80.30 | (R1/f) + Fno | 4.55 |
| EPD/tan(HFOV) | 1.11 | (CT1 + CT2)/T12 | 2.40 |
| R5/EPD | 1.67 | (f1*sin(HFOV))/TD | 0.96 |
| R3/R4 | 1.34 | CT1/CT2 | 0.80 |
| R5/R6 | 1.97 | BFL/(T12 + T23) | 2.41 |
| f/f1 | 0.66 | | |

Sixth Embodiment

Figure 6:
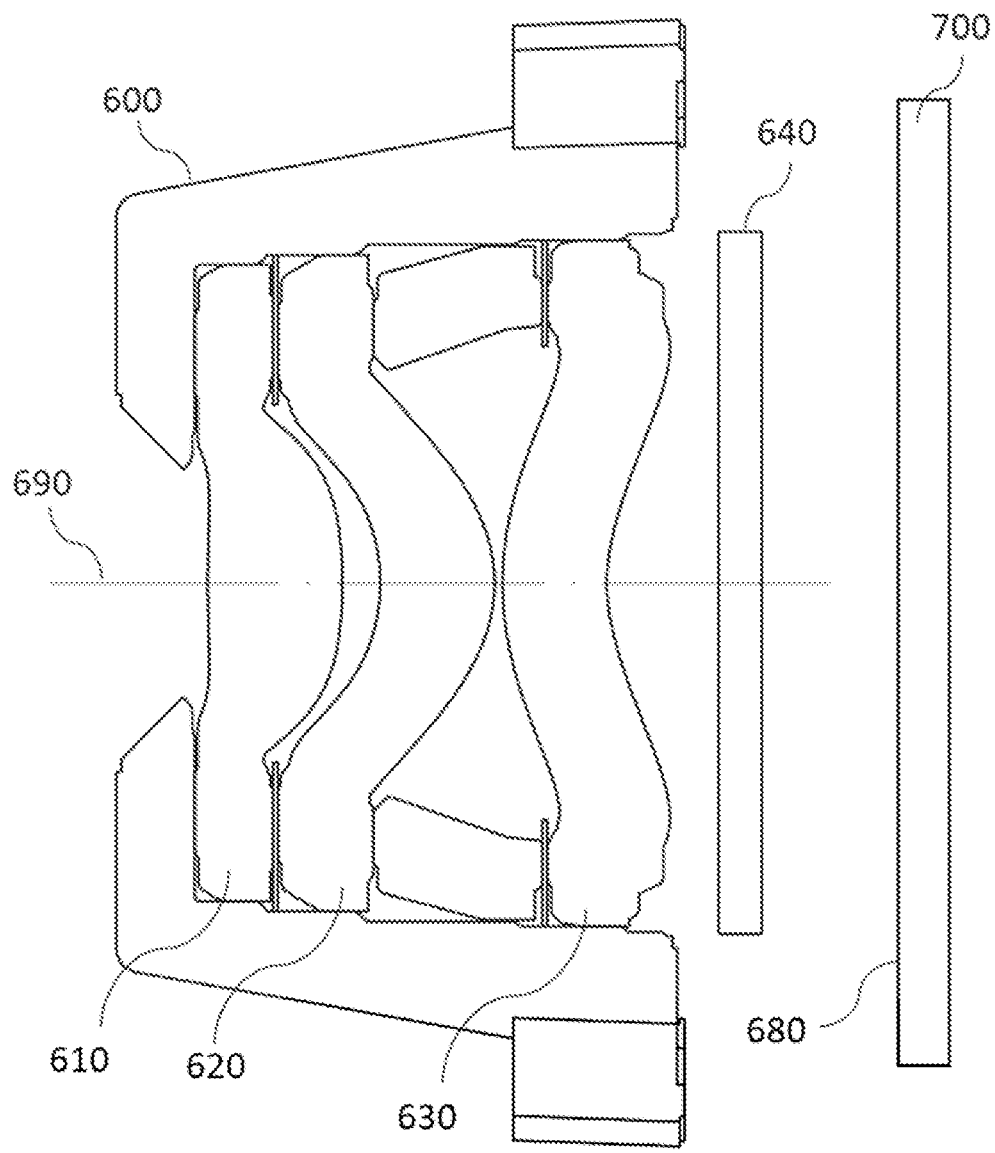
FIG. 6 is a schematic view of a photographing module according to a sixth embodiment of the present disclosure.

Refer to FIG. 6, which shows a photographing module according to the sixth embodiment of the present disclosure. In this embodiment, the photographing module is applied to a mobile phone, but is not limited thereto. The photographing module includes a lens barrel 600; an optical lens assembly, disposed in the lens barrel 600; and an image sensor 700, which is an electronic photosensitive element, disposed on an image plane 680 of the optical lens assembly. The optical lens assembly is the optical lens assembly of the first embodiment, but is not limited thereto, and may also be an optical lens assembly of another embodiment.

In the foregoing embodiments, persons with ordinary skills in the field should understand that in the optical lens assembly and the photographing module provided in the present disclosure, a lens may be made of glass or plastic. The glass lens can increase a degree of freedom in a refractive power configuration of the optical lens assembly, and the glass lens may be made by grinding or molding and other related technologies. The plastic lens can reduce production costs.

In the optical lens assembly provided in the present disclosure, using a lens with refractive power as an example, if a lens surface is a convex surface and a position of the convex surface is not defined, it means that a position of the lens surface near an optical axis is a convex surface; and if a lens surface is a concave surface and a position of the concave surface is not defined, it means that a position of the lens surface near the optical axis is a concave surface.

The optical lens assembly provided in the present disclosure can be applied to a moving focusing optical system according to requirements, has characteristics of excellent aberration correction and good imaging quality, and can be variously applied to electronic imaging systems such as three-dimensional (3D) image capturing device, digital cameras, mobile devices, digital tablets or automotive photography.

What is claimed is:

1. An optical lens assembly, in order from an object side to an image side, comprising:
a stop;
a first lens with positive refractive power, comprising an object-side surface and an image-side surface, the image-side surface of the first lens being convex near an optical axis;
a second lens with positive refractive power, comprising an object-side surface and an image-side surface, the object-side surface of the second lens being concave near an optical axis, and the image-side surface of the second lens being convex near an optical axis;
a third lens with negative refractive power, comprising an object-side surface and an image-side surface, the object-side surface of the third lens being convex near an optical axis, the image-side surface of the third lens being concave near an optical axis, and one of the object-side surface and the image-side surface of the third lens is aspheric; and
an IR band-pass filter;
wherein an entrance pupil diameter of the optical lens assembly is EPD, half of a maximum field of view of the optical lens assembly is HFOV, and the following condition is satisfied: 0.59<EPD/tan(HFOV)<1.33.

2. The optical lens assembly according to claim 1, wherein a radius of curvature of the object-side surface of the third lens is R5, and the following condition is satisfied: 1.05<R5/EPD<2.0.

3. The optical lens assembly according to claim 1, wherein a radius of curvature of the object-side surface of the second lens is R3, a radius of curvature of the image-side surface of the second lens is R4, and the following condition is satisfied: 0.97<R3/R4<1.72.

4. The optical lens assembly according to claim 1, wherein a radius of curvature of the object-side surface of the third lens is R5, a radius of curvature of the image-side surface of the third lens is R6, and the following condition is satisfied: 1.2<R5/R6<2.37.

5. The optical lens assembly according to claim 1, wherein a focal length of the optical lens assembly is f, a focal length of the first lens is f1, and the following condition is satisfied: 0.3<f/f1<0.8.

6. The optical lens assembly according to claim 1, wherein a focal length of the optical lens assembly is f, a focal length of the first lens is f1, a focal length of the third lens is f3, and the following condition is satisfied: $-2.8<(f1+f3)/f<-0.32$.

7. The optical lens assembly according to claim 1, wherein a focal length of the third lens is f3, a central thickness of the third lens along the optical axis is CT3, and the following condition is satisfied: $-18.04<f3/CT3<-6.71$.

8. The optical lens assembly according to claim 1, wherein a focal length of the optical lens assembly is f, a radius of curvature of the object-side surface of the second lens is R3, a radius of curvature of the image-side surface of the second lens is R4, and the following condition is satisfied: $2.27<f/(R3*R4)<4.98$.

9. The optical lens assembly according to claim 1, wherein a focal length of the optical lens assembly is f, a radius of curvature of the object-side surface of the first lens is R1, an f-number of the optical lens assembly is Fno, and the following condition is satisfied: $-5.81<(R1/f)+Fno<7.23$.

10. The optical lens assembly according to claim 1, wherein a central thickness of the first lens along the optical axis is CT1, a central thickness of the second lens along the optical axis is CT2, a distance from the image-side surface of the first lens to the object-side surface of the second lens along the optical axis is T12, and the following condition is satisfied: $1.92<(CT1+CT2)/T12<11.85$.

11. The optical lens assembly according to claim 1, wherein a focal length of the first lens is f1, a distance from the object-side surface of the first lens to the image-side surface of the third lens along the optical axis is TD, and the following condition is satisfied: $0.77<f1*\sin(HFOV))/TD<2.36$.

12. The optical lens assembly according to claim 1, wherein a central thickness of the first lens along the optical axis is CT1, a central thickness of the second lens along the optical axis is CT2, and the following condition is satisfied: $0.60<CT1/CT2<1.54$.

13. The optical lens assembly according to claim 1, wherein a distance from the image-side surface of the third lens to the image plane along the optical axis is BFL, a distance from the image-side surface of the first lens to the object-side surface of the second lens along the optical axis is T12, a distance from the image-side surface of the second lens to the object-side surface of the third lens along the optical axis is T23, and the following condition is satisfied: $1.93<BFL/(T12+T23)<11.47$.

14. A photographing module, comprising:
a lens barrel;
an optical lens assembly disposed in the lens barrel; and
an image sensor disposed on an image plane of the optical lens assembly,
wherein the optical lens assembly, in order from an object side to an image side, comprising:
a stop;
a first lens with positive refractive power, comprising an object-side surface and an image-side surface, wherein the image-side surface of the first lens being convex near an optical axis;
a second lens with positive refractive power, comprising an object-side surface and an image-side surface, wherein the object-side surface of the second lens being concave near an optical axis, and the image-side surface of the second lens being convex near an optical axis;
a third lens with negative refractive power, comprising an object-side surface and an image-side surface, wherein the object-side surface of the third lens being convex near an optical axis, the image-side surface of the third lens being concave near an optical axis, and one of the object-side surface and the image-side surface of the third lens is aspheric; and
an IR band-pass filter;
wherein an entrance pupil diameter of the optical lens assembly is EPD, half of a maximum field of view of the optical lens assembly is HFOV, and the following condition is satisfied: $0.59<EPD/\tan(HFOV)<1.33$.

15. The photographing module according to claim 14, wherein a radius of curvature of the object-side surface of the third lens is R5, and the following condition is satisfied: $1.05<R5/EPD<2.0$.

16. The photographing module according to claim 14, wherein a focal length of the optical lens assembly is f, a focal length of the first lens is f1, a focal length of the third lens is f3, and the following condition is satisfied: $-2.8<(f1+f3)/f<-0.32$.

17. The photographing module according to claim 14, wherein a focal length of the optical lens assembly is f, a radius of curvature of the object-side surface of the first lens is R1, an f-number of the optical lens assembly is Fno, and the following condition is satisfied: $-5.81<(R1/f)+Fno<7.23$.

18. The photographing module according to claim 14, wherein a focal length of the first lens is f1, a distance from the object-side surface of the first lens to the image-side surface of the third lens along the optical axis is TD, and the following condition is satisfied: $0.77<f1*\sin(HFOV))/TD<2.36$.

19. The photographing module according to claim 14, wherein a central thickness of the first lens along the optical axis is CT1, a central thickness of the second lens along the optical axis is CT2, and the following condition is satisfied: $0.60<CT1/CT2<1.54$.

20. The photographing module according to claim 14, wherein a distance from the image-side surface of the third lens to the image plane along the optical axis is BFL, a distance from the image-side surface of the first lens to the object-side surface of the second lens along the optical axis is T12, a distance from the image-side surface of the second lens to the object-side surface of the third lens along the optical axis is T23, and the following condition is satisfied: $1.93<BFL/(T12+T23)<11.47$.

* * * * *